(12) United States Patent
Dai et al.

(10) Patent No.: US 11,646,627 B2
(45) Date of Patent: *May 9, 2023

(54) AIR-COOLING SYSTEM FOR PORTABLE GENERATOR

(71) Applicant: N.P.S. Company, LLC, Hurricane, UT (US)

(72) Inventors: Junjie Dai, Shanghai (CN); Jinbao Chen, Yangzhou (CN)

(73) Assignee: N.P.S. Company, LLC, Hurricane, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/813,563

(22) Filed: Jul. 19, 2022

(65) Prior Publication Data

US 2022/0352783 A1  Nov. 3, 2022

Related U.S. Application Data

(63) Continuation of application No. 17/126,927, filed on Dec. 18, 2020, now Pat. No. 11,444,509.

(51) Int. Cl.
| | |
|---|---|
| *H02K 5/20* | (2006.01) |
| *H02K 7/18* | (2006.01) |
| *F02B 63/04* | (2006.01) |
| *H02K 11/33* | (2016.01) |
| *H02K 9/04* | (2006.01) |

(52) U.S. Cl.
CPC .......... *H02K 5/207* (2021.01); *F02B 63/042* (2013.01); *F02B 63/048* (2013.01); *H02K 7/1815* (2013.01); *H02K 9/04* (2013.01); *H02K 11/33* (2016.01)

(58) Field of Classification Search
CPC ...... H02K 5/207; H02K 11/33; H02K 7/1815; H02K 9/04; F02B 63/042; F02B 63/048
See application file for complete search history.

(56) References Cited

U.S. PATENT DOCUMENTS

| | | |
|---|---|---|
| 2014/0159517 A1 | 6/2014 | Furuya |
| 2016/0281581 A1 | 9/2016 | Takahashi et al. |
| 2019/0376437 A1 | 12/2019 | Sarder et al. |

FOREIGN PATENT DOCUMENTS

| | | | |
|---|---|---|---|
| EP | 3219951 A1 * | 9/2017 | ............ F01P 1/06 |
| JP | 2001221047 A | 8/2001 | |

OTHER PUBLICATIONS

U.S. Appl. No. 17/126,927, et al., Non-Final Office Action, dated Apr. 29, 2022, 9 pages.
U.S. Appl. No. 17/126,927, et al., Notice of Allowance, dated Jun. 10, 2022, 8 pages.

* cited by examiner

*Primary Examiner* — Viet P Nguyen
(74) *Attorney, Agent, or Firm* — Stoel Rives LLP

(57) ABSTRACT

Devices, systems, and methods to air cool a portable generator are disclosed. The devices include various air ducts to direct airflow over heated components within a cabinet of the portable generator to cool the components by convection. A damping fan draws ambient temperature air into the cabinet and directs the air into channels of an outflow duct.

20 Claims, 9 Drawing Sheets

US 11,646,627 B2

AIR-COOLING SYSTEM FOR PORTABLE GENERATOR

RELATED APPLICATIONS

This application is a continuation and claims priority to U.S. patent application Ser. No. 17/126,927, titled Air-Cooling System for Portable Generator, filed on Dec. 18, 2020 and is incorporated by reference herein in its entirety.

TECHNICAL FIELD

The present disclosure relates generally to equipment to generate electrical power. More specifically, the present disclosure relates to embodiments of a portable electric power generator. More specifically, the present disclosure relates to embodiments of an air-cooling system for a portable electric power generator.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

In certain instances, a portable electric power generator can be used to provide electrical power when electrical power from a central electrical grid is not available. For example, a portable electric power generator can be used during outdoor events, camping, tailgating, and an unexpected interruption of electrical power from the power grid. In some embodiments, the portable electric power generator includes a combustion engine configured to drive an alternator. The combustion engine can utilize any suitable combustible agent, such as gasoline, propane, and natural gas. The alternator can produce alternating current electricity. In other embodiments, the alternating current electricity can be converted to direct current electricity. In still other embodiments, the direct current electricity can be converted back to alternating current electricity utilizing an inverter.

Embodiments herein describe portable electric power generators. In some embodiments within the scope of this disclosure, the generators include a cabinet. Disposed within the cabinet are a combustion engine and an alternator configured to generate electrical power. The generators further include an air-cooling system configured to guide air over the engine to cool the engine. In some embodiments within the scope of this disclosure, the air-cooling system can include an air inlet to allow ambient temperature air to enter the cabinet, an engine airflow duct to guide air over the engine, and an air outflow duct to guide airflow out of the cabinet. A damping cooling fan can be coupled to the engine and configured to draw the ambient temperature air into the cabinet through the air inlet, over the engine and alternator to draw heat from the engine and alternator, and push the heated air into the air outflow duct and out of the cabinet. In other embodiments, the air-cooling system can include an inverter duct configured to guide airflow over an inverter to draw heat from the inverter.

In use, in embodiments within the scope of this disclosure, the engine may be started. When running, the engine can rotate the damping fan. When rotated, the damping cooling fan may draw ambient temperature air through the air inlets into the cabinet. In some embodiments, the air may flow through the inverter duct and over the inverter. The air from the inverter duct can be directed toward the engine and be guided by the engine duct over a cylinder head and cylinder block to draw heat from the cylinder head and the cylinder block. The heated air can flow from the engine duct, over the alternator, and to the outflow duct. The air may flow through the outflow duct and exit the outflow duct through an airflow outlet to the atmosphere.

Figure 1:
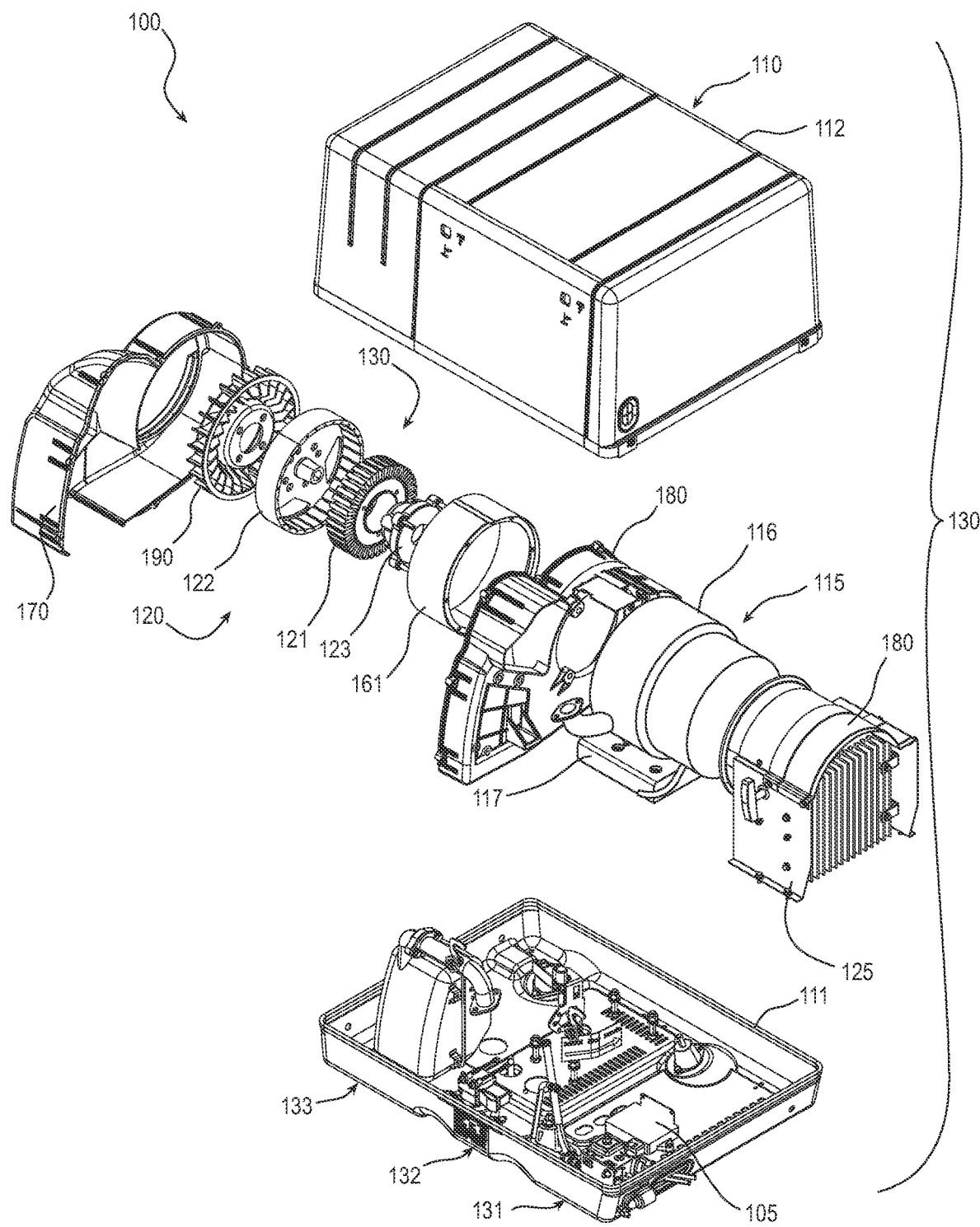
FIG. 1 is an exploded perspective view of an embodiment of an air-cooling system for a portable generator.
Figure 2:
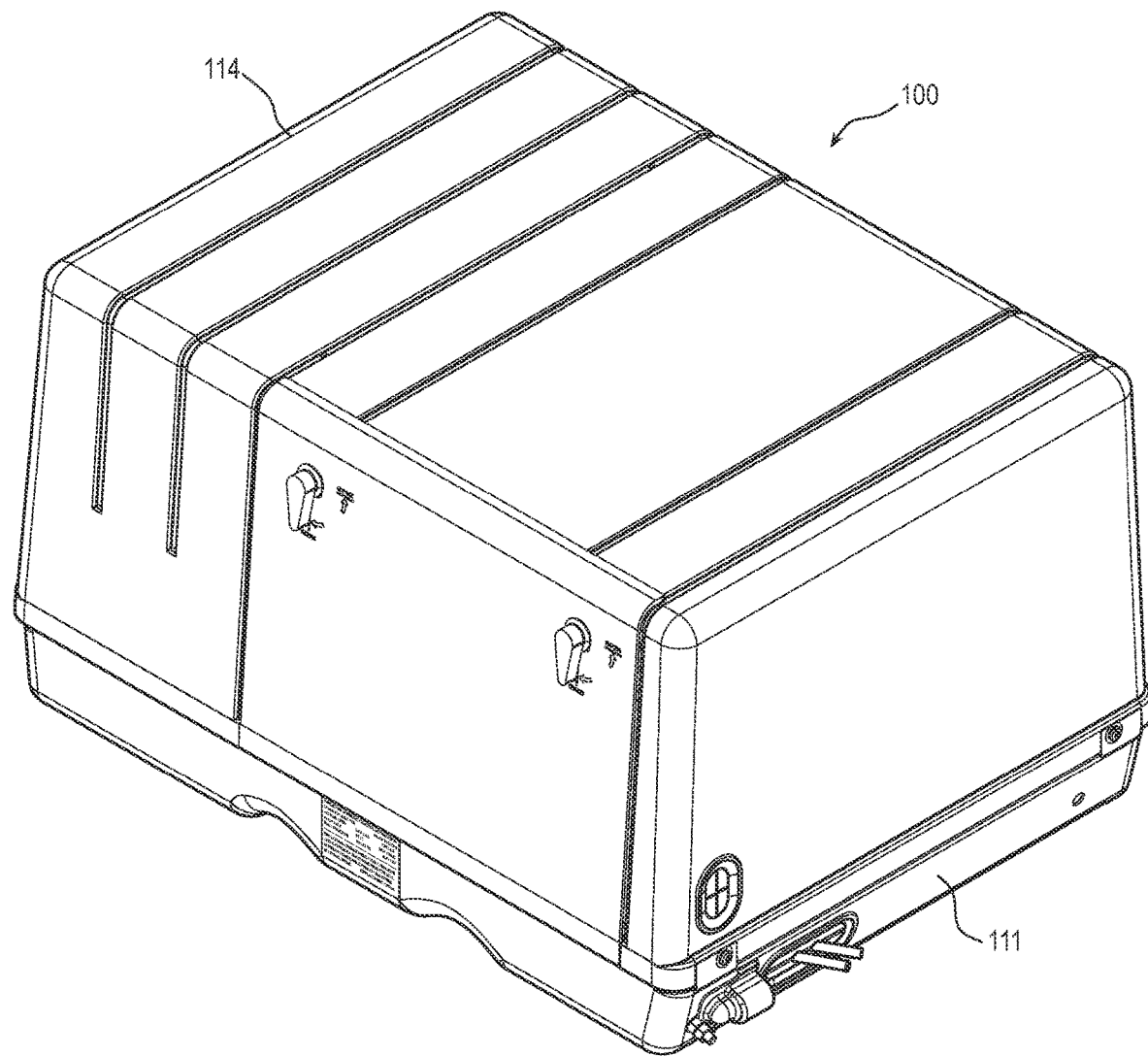
FIG. 2 is a perspective view of an embodiment of a cabinet of the portable generator of FIG. 1.
Figure 3:
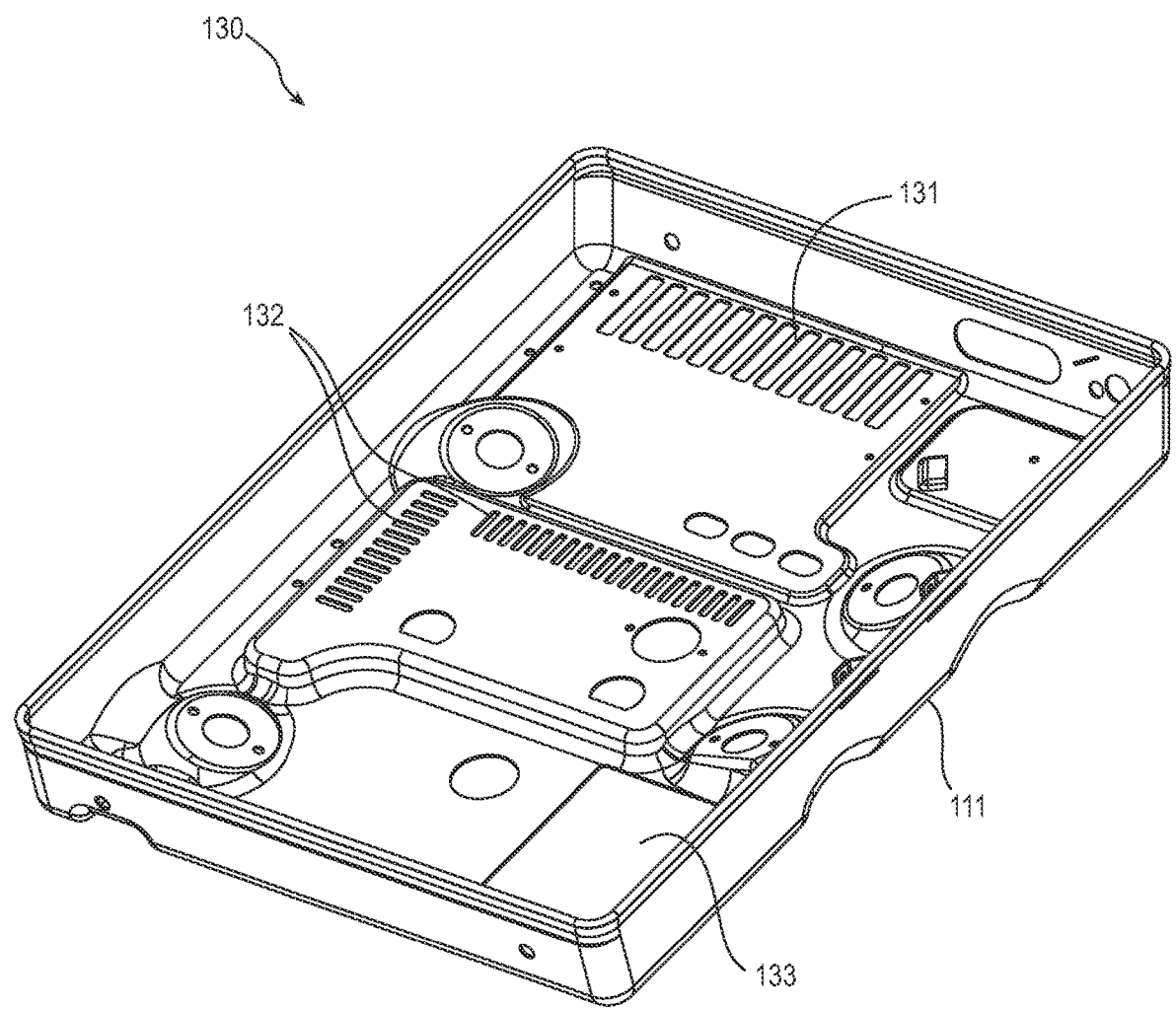
FIG. 3 is a perspective view of an embodiment of a chassis of the cabinet of FIG. 2.
Figure 4:
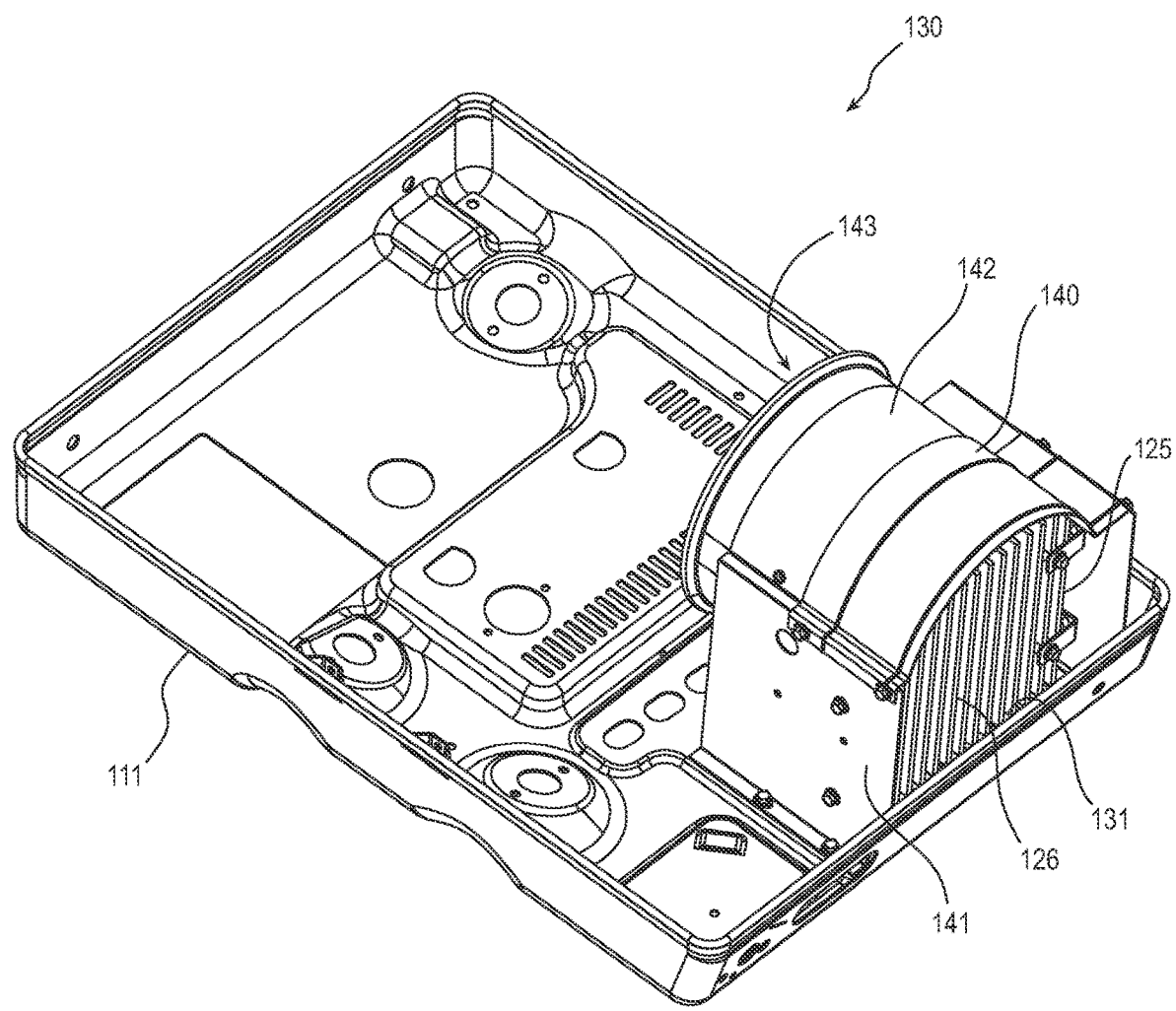
FIG. 4 is perspective view of an inverter airflow duct of the air-cooling system of FIG. 1.
Figure 5:
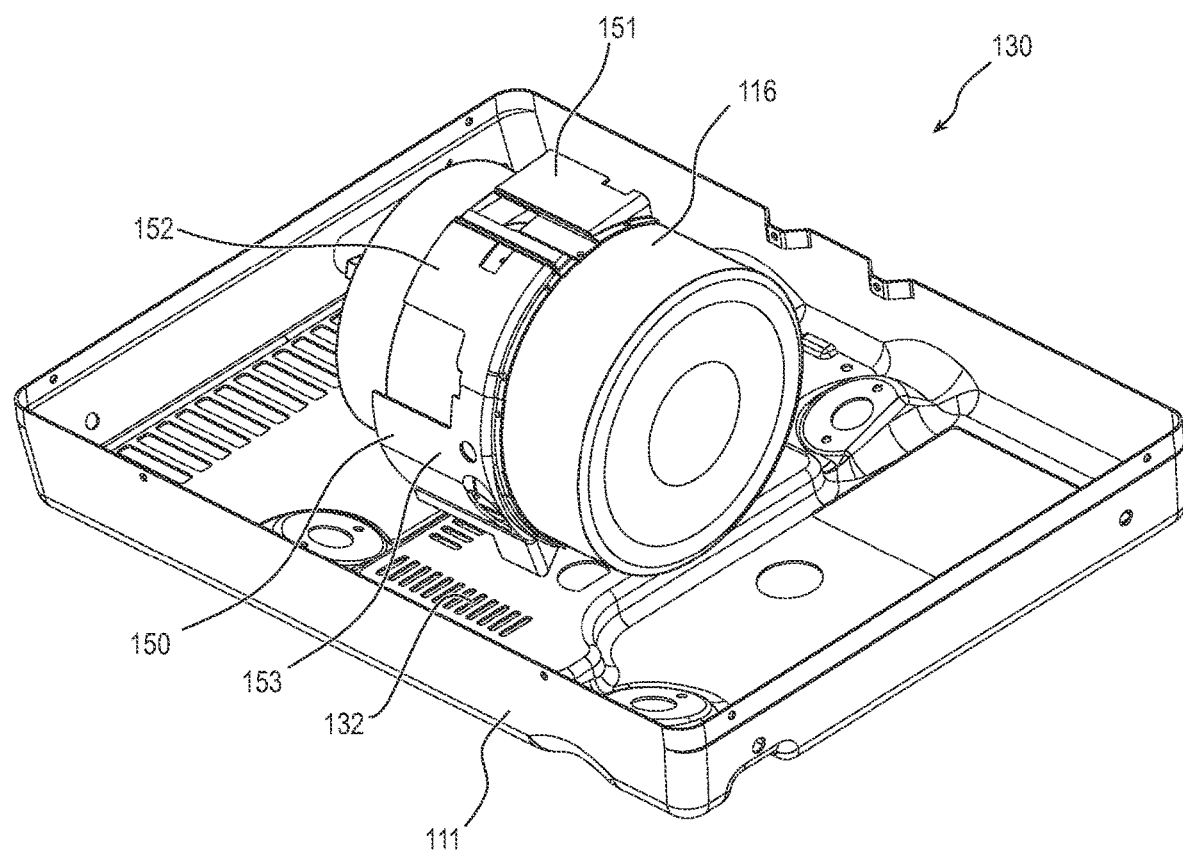
FIG. 5 is a perspective view of an engine airflow duct of the air-cooling system of FIG. 1.
Figure 7A:
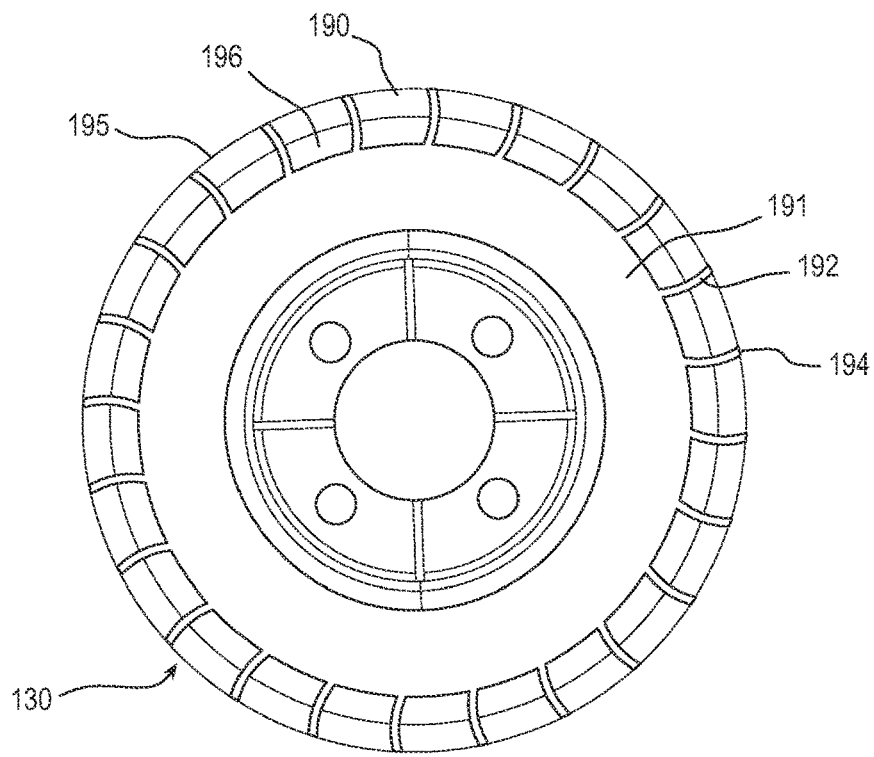
FIG. 7A is a front view of an embodiment of a damping fan of the air-cooling system of FIG. 1.
Figure 7B:
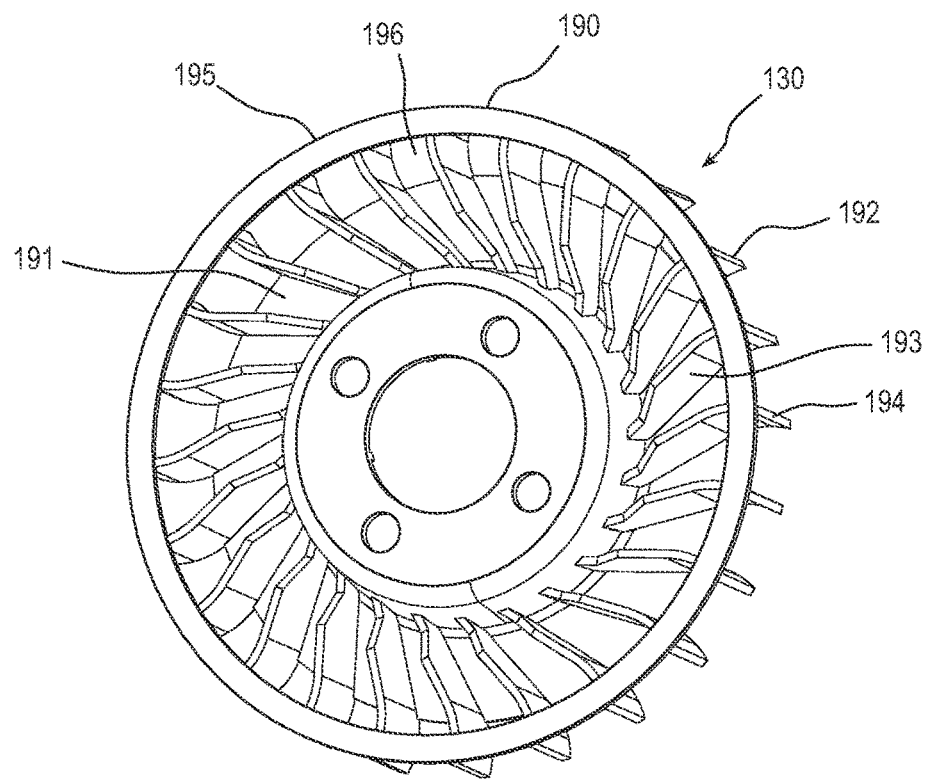
FIG. 7B is a perspective back view of the damping fan of FIG. 7A.
Figure 8:
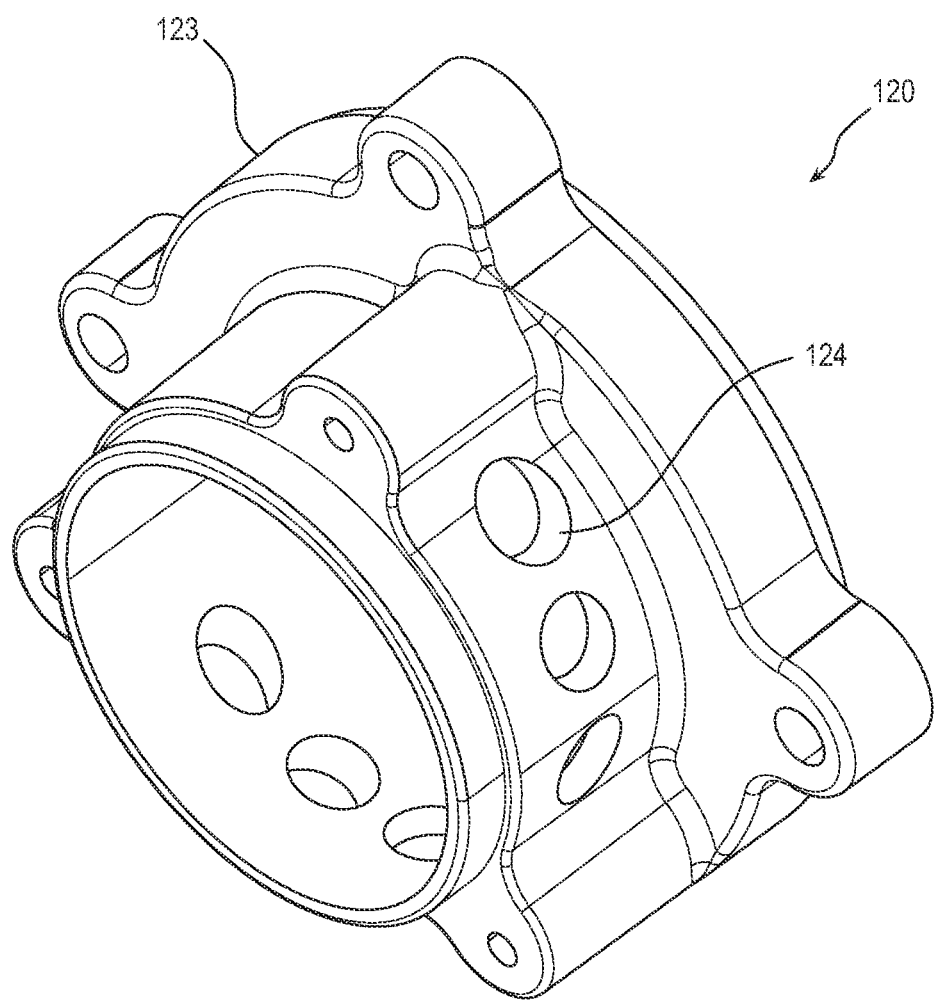
FIG. 8 is a perspective view of an embodiment of a connecting flange of the air-cooling system of FIG. 1.

FIG. 1 illustrates an embodiment of an air-cooling system for a portable generator. FIG. 2 illustrates an embodiment of a cabinet of the portable generator. FIG. 3 illustrates an embodiment of a chassis of the cabinet of the portable generator. FIG. 4 illustrates an inverter airflow duct of the air-cooling system. FIG. 5 illustrates an engine airflow duct of the air-cooling system. FIGS. 6A-6D illustrate embodiments of an outer duct and an inner duct of an outflow duct of the air-cooling system. FIGS. 7A and 7B illustrate an embodiment of a damping fan of the air-cooling system. FIG. 8 illustrates an embodiment of a connecting flange of the air-cooling system. In certain views each device may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

FIG. 1 illustrates an exploded view of an embodiment of a portable generator unit 100. As illustrated, the portable generator unit 100 can include a control module 105, a cabinet 110, an engine 115, an alternator 120, and an air-cooling system 130. The cabinet may include a chassis 111 and an upper cabinet 112. The engine 115 can include a cylinder head 116 and a cylinder block 117. The alternator 120 may include a stator 121, a rotor 122, an insulation ring 161, and a connecting flange 123. The air-cooling system 130 can include a first air inlet 131, a second air inlet 132, an airflow outlet 133, an engine airflow duct 150, an outflow duct 160, and a damping cooling fan 190. The outflow duct 160 may include an outer duct 170 and an inner duct 180.

Alternatively, in some embodiments, the portable generator unit 100 may include an electrical inverter 125 and the air-cooling system 130 may include an inverter airflow duct 140.

The engine 115 may be an internal combustion engine that uses a combustible energy source, such as gasoline, natural gas, or propane, to operate. The engine 115 can be a two-stroke or a four-stroke engine. An output of the engine 115 can range from about 1 horsepower to about 15 horsepower.

The stator 121 of the alternator 120 may include magnetic poles. The number of magnetic poles can range from about 12 to about 72. The rotor 122 of the alternator 120 may include permanent magnets or electromagnets. The number of magnets can range from about 6 to about 36. The alternator 120 can be configured to output an alternating current (AC). The output can range from about 1,000 watts to about 15,000 watts. The insulation ring 161 may circumferentially surround the alternator 120 and be disposed between the alternator 120 and the outflow duct 160. The insulation ring 161 can be formed of any suitable material configured to insulate heat and guide the airflow. For example, the material may be any one of steel or heat resistance plastic. Other materials are contemplated.

The electrical inverter 125 may be configured to invert direct current to stable alternating current. The electrical inverter 125 can include airflow fins to facilitate convection cooling of the electrical inverter 125.

The control module 105 can be configured to control any one of a key fob remote control system, an electric control system, an auto choke system, a fuel supply system, and a battery charging system. The control module 105 can include a processor configured to be pre-programmed and/or configured to be programmed by the user. The control module 105 may be hard wired to communicate with the various systems or may communicate with the systems wirelessly.

FIG. 2 illustrates the cabinet 110 of the portable generator unit 100. In certain embodiments, the portable generator unit 100 may not include the cabinet 110 and may be configured as an "open frame" portable generator unit. As illustrated, the cabinet 110 can include the chassis 111 and the upper cabinet 112. The cabinet 110 may be formed of any material suitable of withstanding high temperatures and harsh environmental conditions. For example, the cabinet can be formed of fiberglass, steel, aluminum or plastic. The chassis 111 may be of a unibody construction and include features such as holes, slots, etc., for securement of components of the portable generator unit 100 within the cabinet 110. In some embodiments, the upper cabinet 112 may be of a unibody construction. In other embodiments, the upper cabinet 112 can include two, three, four, or more panels coupled together to form the upper cabinet 112. In certain embodiments, insulation panels may be disposed on an inside surface of the upper cabinet. The insulation panels can absorb noise generated by the engine 115 and other components of the portable generator unit 100. The insulation panels may also prevent an exterior surface of the upper cabinet 112 from heating to avoid burning a user if touched.

FIGS. 3-8 illustrate embodiments of components of the air-cooling system 130. The air-cooling system 130 can be configured to guide or direct airflow within the cabinet 110 to convection cool the operational components of the portable generator unit 100, such as the engine 115, the alternator 120, and the electrical inverter 125. FIG. 3 illustrates the first air inlets 131 and the second air inlets of the air-cooling system 130. As illustrated, the first air inlets 131 and the second air inlets 132 can be disposed in a bottom portion of the chassis 111. The first air inlets 131 can allow ambient temperature air to enter the cabinet 110 as a first airflow. The second air inlets 132 can allow ambient temperature air to enter the cabinet 110 as a second airflow. The air inlets 131, 132 are depicted as a plurality of elongate slots configured to allow the ambient temperature air to pass through the slots. In other embodiments, the air inlets 131, 132 may include any suitable shape to allow the passage of the ambient temperature air. For example, the shape of the air inlets 131, 132 may be circular, oval, triangular, and square. Other suitable shapes are contemplated. Each of the air inlets 131, 132 includes an open area adequate to allow an airflow into the cabinet. The open area of the air inlets 131 can greater than 85 square centimeters and the open area of the air inlets 132 can be greater than 10 square centimeters.

The chassis 111 can further include an airflow outlet 133 in the bottom portion of the chassis 111. The airflow outlet 133 can be in fluid communication with the outflow duct 160 such that heated air can be discharged from the outflow duct 160 through the airflow outlet 133. The airflow outlet 133 can be of any suitable shape to conform to the outflow duct 160.

FIG. 4 illustrates the inverter airflow duct 140 of the air-cooling system 130. As illustrated, the inverter airflow duct 140 can include a vertical portion 141 disposed over the first air inlets 131 and coupled to the chassis 111. A cylindrical portion 142 may be disposed on top of the vertical portion 141. The inverter 125 can be disposed within the inverter airflow duct 140 and over the first air inlets 131. The inverter airflow duct 140 can be configured to guide or direct the first airflow from the first air inlets 131, over fins 126 of the inverter 125, and out an open end 143 of the cylindrical portion 142 toward the engine 115. As the first airflow passes over the fins 126, heat produced by the inverter 125 can be drawn off the fins 126 by convection cooling and transferred to the air of the first airflow. The convection cooling may cool or decrease the temperature of the electrical inverter 125 by a temperature ranging from about 0 degrees Centigrade to about 30 degrees Centigrade.

FIG. 5 illustrates the engine airflow duct 150 of the air-cooling system 130. As illustrated, the engine airflow duct 150 can include a first portion 151, a second portion 152, and a third portion 153 coupled together and disposed at least partially around the engine 115. The engine airflow duct 150 may be configured to guide or direct the first airflow received from the inverter airflow duct 140 over the cylinder head 116 and the second airflow over the cylinder block 117 to convection cool the engine 115 and to prevent the heated air of the first and second airflows from dispersing throughout the cabinet 110. The convection cooling may cool or decrease the temperature of the engine 115 by a temperature ranging from about 0 degrees Centigrade to about 10 degrees Centigrade.

Figure 6A:
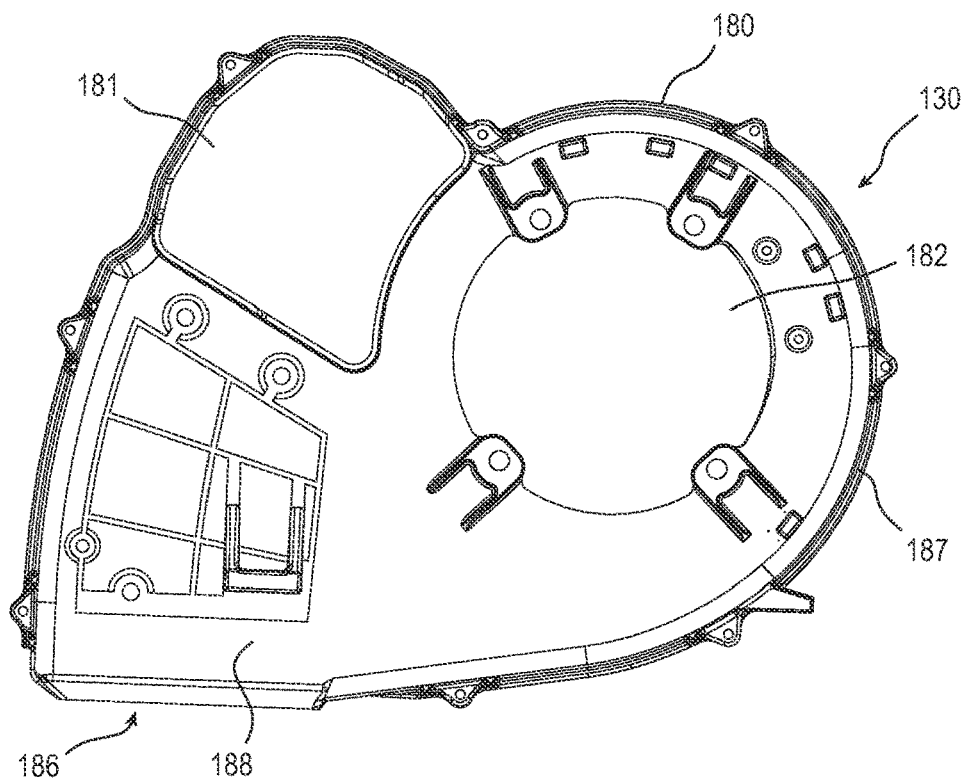
FIG. 6A is a front view of an embodiment of an outer duct of an outflow duct of the air-cooling system of FIG. 1.
Figure 6B:
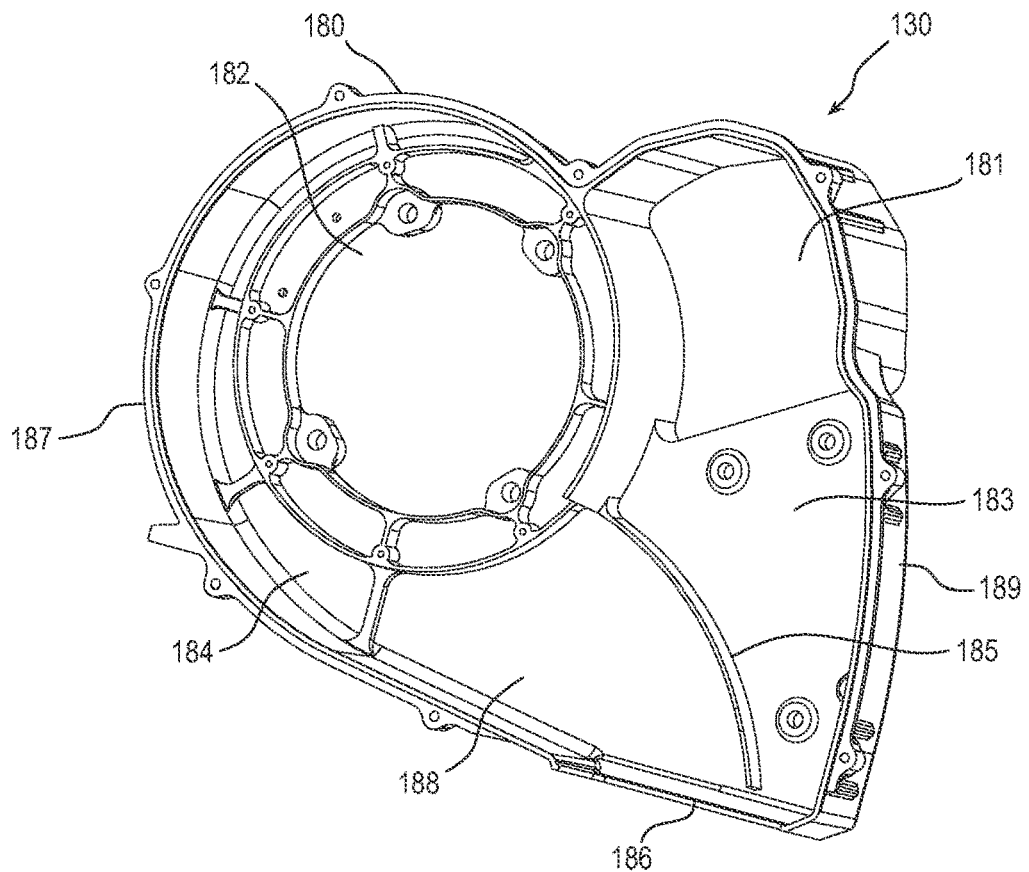
FIG. 6B is a perspective back view of the outer duct of FIG. 6A.

FIGS. 6A-6D illustrate an embodiment of the outflow duct 160 of the air-cooling system 130. FIG. 6A illustrates an exterior of the inner duct 180 and FIG. 6B illustrates an interior of the inner duct 180. As illustrated, the inner duct 180 can include a first airflow passage 181, a second airflow passage, a first airflow channel 183, a second airflow channel 184, an airflow distributor 185, and an airflow outlet 186. The inner duct 180 may include any suitable material, such as aluminum or steel, and be formed using any suitable technique, such as stamping. Other materials and forming techniques are contemplated. The first airflow passage 181 may be disposed to a side of the inner duct 180 and have a general rectangular shape. The first airflow passage 181 can be configured to receive the heated first airflow from the cylinder head 116 of the engine 115 and guide or direct the first airflow into the first airflow channel 183.

The second airflow passage 182 can be disposed on an opposite side of the inner duct 180 wherein it is in alignment with the alternator 120. The second airflow passage 182 may have a generally circular shape. The second airflow passage 182 may be sized to receive the alternator 120 and the damping cooling fan 190. A diameter of the second airflow passage 182 can range from about 10 centimeters to about 50 centimeters. The second airflow passage 182 may be configured to receive the second airflow from the cylinder block 117 of the engine 115 and guide or direct the second airflow into the first airflow channel 183.

The first airflow channel 183 can be in fluid communication with the first airflow passage 181 and can be defined by a side wall 189 and the airflow distributor 185. The airflow distributor 185 can divide the first airflow channel 183 from the second airflow channel 184 wherein air flowing through the first airflow channel 183 cannot substantially mix with air flowing through the second airflow channel 184. The airflow distributor 185 may include an arcuate shape having a radius ranging from about 14 centimeters to about 24 centimeters. The airflow distributor 185 may divide the airflow outlet 186 into two outlets, one in fluid communication with the first airflow channel 183 and the second in fluid communication with the second airflow channel 184.

The second airflow channel 184 can be in fluid communication with the second airflow passage 182 and can be defined by a wall 187 having a convex arcuate shape. A radius of the arcuate shape may range from about 5 centimeters to about 30 centimeters. The arcuate shape can provide for a non-turbulent airflow through the second airflow channel 184. Further, the second airflow channel 184 can be defined by an exterior wall 188. A thickness of a portion of the exterior wall 188 adjacent the airflow outlet 186 may be tapered toward the airflow outlet 186 to increase a cross-sectional area of the second airflow channel 184. The increased cross-sectional area may allow the airflow within the second airflow channel 184 to flow towards the airflow outlet 186 with low resistance. The exterior wall 188 may taper from about 2 millimeters to about 6 millimeters to a thickness ranging from about 2 millimeters to about 5 millimeters.

Figure 6C:
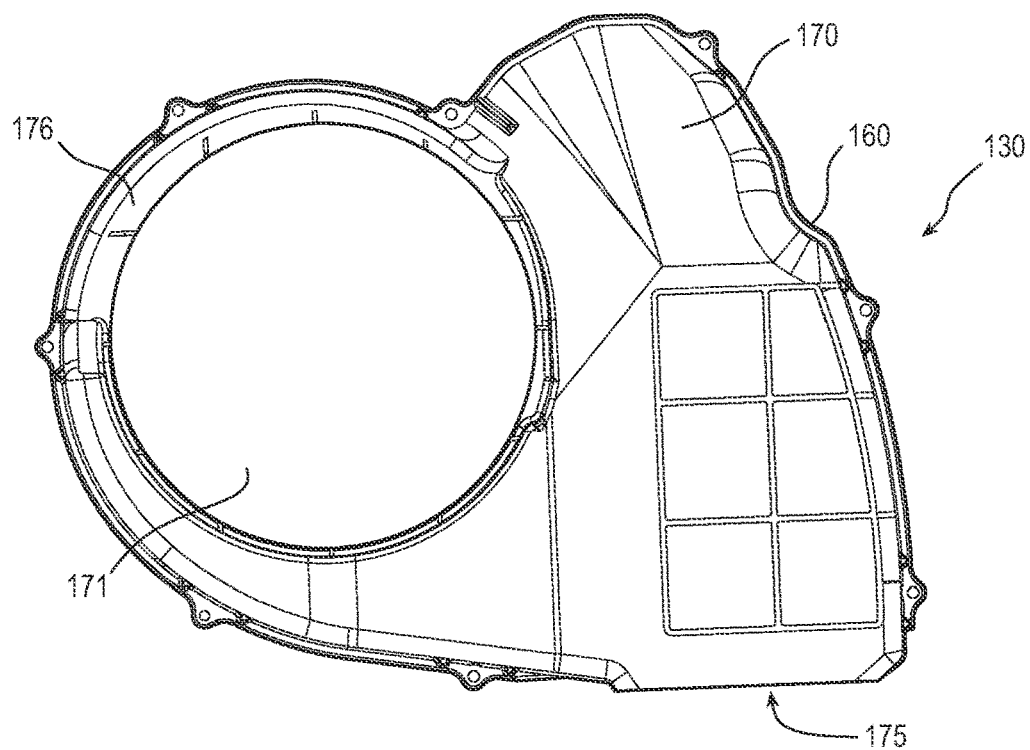
FIG. 6C is a front view of an embodiment of an inner duct of the outflow duct of the air-cooling system of FIG. 1.
Figure 6D:
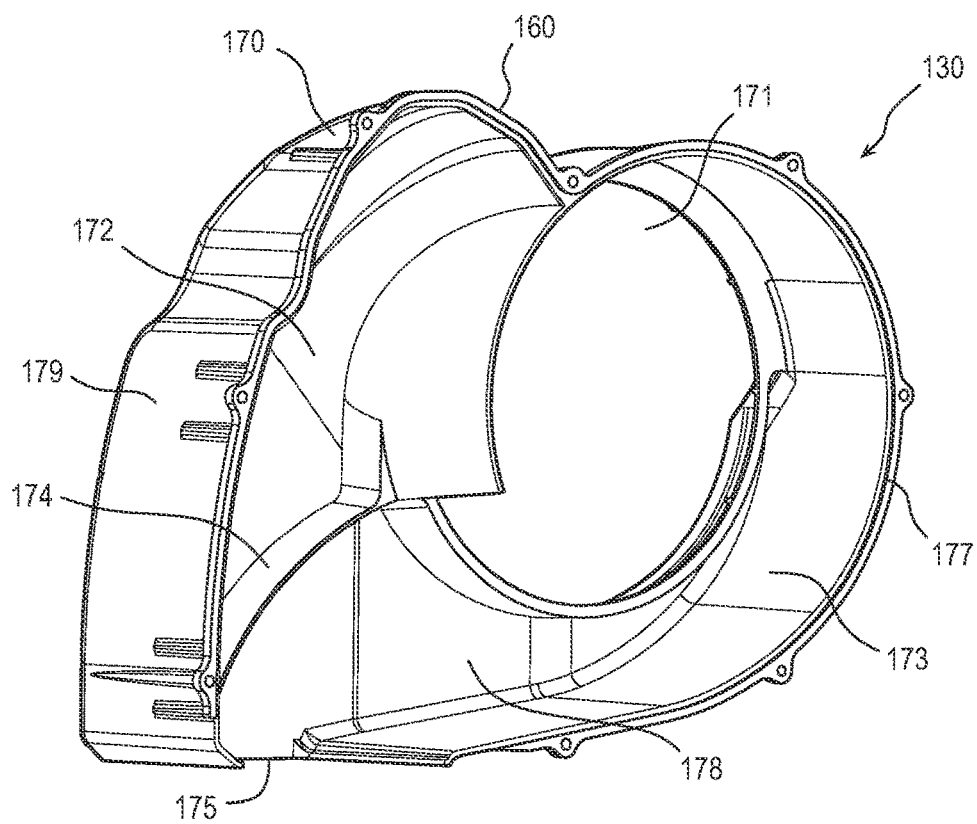
FIG. 6D is a perspective back view of the inner duct of FIG. 6C.

FIG. 6C illustrates an exterior of the outer duct 170 and FIG. 6D illustrates an interior of the outer duct 170. As illustrated, the outer duct 170 can include an airflow passage 171. The outer duct 170 may include any suitable material, such as aluminum or steel, and be formed using any suitable technique, such as stamping. Other materials and forming techniques are contemplated. The outer duct 170 can include an airflow passage 171, a first airflow channel 172, a second airflow channel 173, an airflow distributor 174, and an airflow outlet 175. The airflow passage 171 can include an exterior opening 176 and may be disposed to a side of the outer duct 170 such that it is in alignment with alternator 120. The airflow passage 171 may be sized to receive the damping cooling fan 190 and the alternator 120. A diameter of the airflow passage can range from about 10 centimeters to about 50 centimeters. A diameter of the exterior opening 176 may be smaller than a diameter of the damping cooling fan 190. The diameter of the exterior opening 176 may range from about 10 centimeters to about 60 centimeters. The airflow passage 171 can be configured to receive the second airflow from the engine 115 and guide or direct the second airflow into the second airflow channel 173.

The first airflow channel 172 can be in fluid communication with the first airflow passage 181 and the first airflow channel 183. The first airflow channel 172 may be defined by a side wall 179 and the airflow distributor 174. The airflow distributor 174 can divide the first airflow channel 172 from the second airflow channel 173 wherein air flowing through the first airflow channel 172 cannot substantially mix with air flowing through the second airflow channel 173. The airflow distributor 174 may include an arcuate shape having a radius ranging from about 5 centimeters to about 30 centimeters. The airflow distributor 174 may divide the airflow outlet 175 into two outlets, one in fluid communication with the first airflow channel 172 and the second in fluid communication with the second airflow channel 173.

The second airflow channel 173 can be in fluid communication with the second airflow passage 182 and the second airflow channel 184. The second airflow channel 173 may be defined by a wall 177 having a convex arcuate shape. A radius of the arcuate shape may range from about 8 centimeters to about 30 centimeters. The arcuate shape can provide for a non-turbulent airflow through the second airflow channel 173. Further, the second airflow channel 173 can be defined by an exterior wall 178. A thickness of a portion of the exterior wall 178 adjacent the airflow outlet 175 may be tapered toward the airflow outlet 175 to increase a cross-sectional area of the second airflow channel 173. The increased cross-sectional area may allow the airflow within the second airflow channel 173 to flow towards the airflow outlet 175 with low resistance. The exterior wall 178 may taper from a thickness ranging from about 2 millimeters to about 6 millimeters to a thickness ranging from about 2 millimeters to about 5 millimeters.

FIGS. 7A and 7B illustrate the damping cooling fan 190 of the air-cooling system 130. The damping cooling fan 190 can be coupled to and rotated by the engine 115. The damping cooling fan 190 may be formed of any suitable rigid material. For example, the rigid material can be a metal, such as aluminum or steel, or a reinforced plastic, such as polycarbonate, or other plastic. Other materials are contemplated. As illustrated, the damping cooling fan 190 can include a damping portion 191, a plurality of fan blades 192, and a choke ring 195. The damping portion 191 can be a circular plate extending radially outward from a central axis of the damping cooling fan 190. A diameter of the damping portion 191 can range from about 10 centimeters to about 50 centimeters. The damping portion 191 can prevent air from passing between the fan blades 192 adjacent the central axis of the damping cooling fan 190.

The fan blades 192 may be coupled to the damping portion 191 and have a height ranging from about 2.5 centimeters to about 6 centimeters. A radial inner portion 193 of the fan blades 192 may be disposed at an angle ranging from 100 degrees to about 165 degrees relative to a perpendicular plane extending through the central axis. A distal portion 194 of the fan blades 192 can include an arcuate shape. The arcuate shape can include a radius ranging from about 11 centimeters to about 31 centimeters. The arcuate shape may be configured to capture air and direct the air into the second airflow channels 173, 184 of the outflow duct 160. The choke ring 195 may be coupled to the peripheral ends of the fan blades 192. The choke ring 195 can have a width ranging from about 5 millimeters to about 20 millimeters. The choke ring 195 may prevent airflow from flowing toward the alternator 120 and guide or direct airflow into the second airflow channels 173, 184.

FIG. 8 illustrates the connecting flange 123 of the alternator 120. The connecting flange 123 may be configured to couple the stator 121 to the engine 115 to prevent the stator 121 from rotating. As illustrated, the connecting flange can include airflow passages 124 configured to allow the first airflow to flow through the connecting flange 123. The connecting flange 123 can be formed of any suitable material, such as aluminum or steel. Other materials are contemplated.

In use, the engine may be started by an electric starter or pull starter. When running, the engine can rotate the damping fan. When rotated, the damping fan may draw ambient temperature air through the first air inlets into the cabinet to form a first airflow and through the second air inlets into the cabinet to form a second airflow. In some embodiments, the first airflow may flow through the inverter duct and over the inverter. As the first airflow passes over the inverter, heat from the inverter can be transferred to the first airflow.

The first airflow can flow from the inverter duct to the engine and be directed or guided by the engine duct over the cylinder head. As the first airflow passes over the cylinder head, heat from the cylinder head can be transferred to the first airflow to further heat the first airflow. The first airflow can flow from the engine duct to the outflow duct. The first airflow may flow through the first airflow passage of the inner duct, into the first airflow channel, and through the airflow outlet into the atmosphere.

The second airflow can flow over the cylinder block. As the second airflow flows over the cylinder block, heat from the cylinder block may be transferred to the second airflow. The second airflow can flow from the cylinder block and over the alternator. In some embodiments, the second airflow may flow through the connecting flange. As the second airflow flows over the alternator, heat from the alternator may be transferred to the second airflow. The second airflow can flow from the alternator to the damping fan. The damping portion of the damping fan can prevent the second airflow from passing through the damping fan. The fan blades of the damping fan can direct the second airflow toward the outflow duct and into the second airflow channel. The choke ring of the damping fan may prevent the second airflow from flowing toward the alternator. The second airflow can flow into the second airflow channel and through the airflow outlet into the atmosphere.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified. For example, a method of air-cooling a portable generator may include one or more of the following steps: starting a combustion engine disposed within a portable generator cabinet; rotating a damping cooling fan; drawing a first airflow through a first air inlet into the portable generator cabinet; guiding the first airflow over a cylinder head of the combustion engine; guiding the first airflow through a first airflow passage, a first airflow channel, and a first airflow outlet of an air outflow duct; drawing a second airflow through a second air inlet into the portable generator cabinet; drawing the second airflow over a cylinder block of the combustion engine; accelerating the second airflow by rotation of the damping cooling fan; and guiding the second airflow through a second airflow passage, a second airflow channel, and a second airflow outlet of the air outflow duct. Other steps are also contemplated.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment.

It will be appreciated that various features are sometimes grouped together in a single embodiment, figure, or description thereof for the purpose of streamlining the disclosure. Many of these features may be used alone and/or in combination with one another.

The phrases "coupled to" and "in communication with" refer to any form of interaction between two or more entities, including mechanical, electrical, magnetic, electromagnetic, fluid, and thermal interaction. Two components may be coupled to or in communication with each other even though they are not in direct contact with each other. For example, two components may be coupled to or in communication with each other through an intermediate component.

"Fluid" is used in its broadest sense, to refer to any fluid, including both liquids and gases as well as solutions, compounds, suspensions, etc., which generally behave as fluids.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

The terms "a" and "an" can be described as one, but not limited to one. For example, although the disclosure may recite a housing having "a stopper," the disclosure also contemplates that the housing can have two or more stoppers.

Unless otherwise stated, all ranges include both endpoints and all numbers between the endpoints.

Recitation in the claims of the term "first" with respect to a feature or element does not necessarily imply the existence of a second or additional such feature or element.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A portable generator unit, comprising:
a cabinet comprising an engine and an alternator, the engine and the alternator configured to generate electrical power, wherein the engine includes an output-shaft side and a recoil-starter side;
an air-cooling system coupled to the cabinet and comprising an air inlet and an air outlet disposed in the cabinet,
wherein the air inlet allows airflow to enter the cabinet,
wherein the air-cooling system is configured to guide the airflow over the engine and the alternator using one or more of a plurality of ducts, and
wherein the air outlet allows the airflow to exit the cabinet;
an inverter airflow duct disposed around an electrical inverter, and configured to guide the airflow around the electrical inverter;
an engine head airflow duct disposed around an engine head, and configured to, based on the airflow having been guided around the electrical inverter, guide a first portion of the airflow around the engine head and over the alternator;
an engine block airflow duct disposed around an engine block, and configured to, based on the airflow having been guided around the electrical inverter, guide a second portion of the airflow around the engine block; and
an air outflow duct, coupled to an airflow distributor, the air outflow duct configured to receive the first portion of the airflow and the second portion of the airflow, and to guide the first portion of the airflow and the second portion of the airflow to exit the cabinet through the air outlet.

2. The portable generator unit of claim 1, wherein the engine block airflow duct disposed around the engine block is further configured to, based on the second portion of the airflow having been guided around the engine block, guide the second portion of the airflow around the alternator.

3. The portable generator unit of claim 1, wherein the air-cooling system further comprises an insulation ring disposed between the alternator and the air outflow duct, wherein the insulation ring is configured to guide the airflow, including the first portion and the second portion, toward the air outflow duct.

4. The portable generator unit of claim 1, further comprising a damping cooling fan coupled to the engine and configured to draw airflow through the inverter airflow duct.

5. The portable generator unit of claim 4, wherein the damping cooling fan comprises:
a damping portion;
a plurality of fan blades extending radially outward from the damping portion;
a choke ring disposed at a perimeter of the plurality of the fan blades; and
a fan blade airflow passage defined by adjacent fan blades of the plurality of fan blades, the damping portion, and the choke ring.

6. The portable generator unit of claim 1, wherein the alternator is coupled to the engine on the output-shaft side.

7. The portable generator unit of claim 1, wherein the engine is a combustion engine.

8. The portable generator unit of claim 1, wherein the airflow distributor is further configured to maintain separation between the first airflow portion and the second airflow portion.

9. The portable generator unit of claim 1, wherein the airflow allowed to enter the cabinet by the air inlet is of ambient temperature.

10. The portable generator unit of claim 1, wherein the inverter airflow duct comprises a vertical portion disposed over the air inlet and a cylindrical portion in fluid communication with the vertical portion, and configured to guide the guide the first portion of the airflow around the engine head via the engine head airflow duct disposed around an engine head.

11. The portable generator unit of claim 1, wherein the inverter airflow duct comprises:
a first panel;
a second panel;
a third panel;
wherein the first panel, the second panel, and the third panel are coupled to and at least partially surround the engine.

12. The portable generator unit of claim 1, further comprising a connecting flange configured to couple an alternator stator with the engine, wherein the connecting flange comprises a plurality of airflow passages, and wherein the airflow passages enable airflow through the one or more of the plurality of ducts.

13. The portable generator unit of claim 1, further comprising a control module configured to control any one of a key fob remote control system, an auto choke system, an electric control system, a fuel supply system, a battery charting system, or combinations thereof.

14. A portable generator unit, comprising:
a cabinet comprising an engine and an alternator, wherein the engine includes an output-shaft side and a recoil-starter side;
an air-cooling system coupled to the cabinet and comprising an air inlet and an air outlet disposed in the cabinet;
an inverter airflow duct disposed around an electrical inverter, and configured to guide airflow around the electrical inverter and towards an engine head airflow duct and an engine block airflow duct;

the engine head airflow duct disposed around an engine head, and configured to guide a first portion of the airflow around the engine head and over the alternator;

the engine block airflow duct disposed around an engine block, and configured to guide a second portion of the airflow around the engine block; and an air outflow duct configured to receive the first portion of the airflow and the second portion of the airflow, and to guide the first portion of the airflow and the second portion of the airflow to exit the cabinet through the air outlet.

15. The portable generator unit of claim 14, wherein:

the air inlet is configured to allow airflow to enter the cabinet;

the air-cooling system is configured to guide the airflow over the engine and the alternator using one or more of a plurality of ducts; and the air outlet is configured to the airflow to exit the cabinet.

16. The portable generator unit of claim 14, wherein the engine head airflow duct disposed around the engine head is configured to guide the first portion of the airflow around the engine head and over the alternator based at least on the airflow having been guided around the electrical inverter, and wherein the engine block airflow duct disposed around the engine block is configured to guide the second portion of the airflow around the engine block based at least on the airflow having been guided around the electrical inverter.

17. The portable generator unit of claim 14, wherein the air outflow duct is coupled to an airflow distributor, and wherein the airflow distributor is configured to maintain separation between the first airflow portion and the second airflow portion.

18. The portable generator unit of claim 14, further comprising a connecting flange configured to couple an alternator stator with the engine, wherein the connecting flange comprises a plurality of airflow passages, and wherein the airflow passages enable airflow through the one or more of the plurality of ducts.

19. The portable generator unit of claim 14, further comprising a damping cooling fan coupled to the engine and configured to draw airflow through the inverter airflow duct, and wherein the damping cooling fan comprises:

a damping portion;

a plurality of fan blades extending radially outward from the damping portion;

a choke ring disposed at a perimeter of the plurality of the fan blades; and a fan blade airflow passage defined by adjacent fan blades of the plurality of fan blades, the damping portion, and the choke ring.

20. The portable generator unit of claim 14, wherein the alternator is coupled to the engine on the output-shaft side.

\* \* \* \* \*